United States Patent
Marshall

(10) Patent No.: US 11,044,539 B1
(45) Date of Patent: Jun. 22, 2021

(54) MOUSE OVER ELEPHANT

(71) Applicant: Sam A Marshall, Georgetown, TX (US)

(72) Inventor: Sam A Marshall, Georgetown, TX (US)

( * ) Notice: Subject to any disclaimer, the term of this patent is extended or adjusted under 35 U.S.C. 154(b) by 31 days.

(21) Appl. No.: 16/041,816

(22) Filed: Jul. 22, 2018

(51) Int. Cl.
| | |
|---|---|
| *H04J 14/00* | (2006.01) |
| *H04Q 11/00* | (2006.01) |
| *H04L 12/931* | (2013.01) |
| *G06F 15/173* | (2006.01) |
| *H04L 12/861* | (2013.01) |
| *H04L 12/28* | (2006.01) |

(52) U.S. Cl.
CPC ... *H04Q 11/0066* (2013.01); *G06F 15/17337* (2013.01); *H04L 49/602* (2013.01); *H04L 49/90* (2013.01); *H04L 12/2885* (2013.01); *H04Q 2011/0073* (2013.01)

(58) Field of Classification Search
CPC ............ H04J 14/0217; H04J 14/0267; H04Q 11/0005; H04Q 11/0066; H04Q 2011/0073; H04Q 2213/296; H04B 10/27; G06F 15/17337; H04L 49/602; H04L 49/90; H04L 12/2885; H04L 49/351; H04L 49/357; H04L 49/60; H04L 12/462
USPC ......... 398/54, 45, 46, 48, 49, 50, 51, 55, 56
See application file for complete search history.

(56) References Cited

U.S. PATENT DOCUMENTS

| | | | | |
|---|---|---|---|---|
| 7,773,608 | B2* | 8/2010 | Miles .................. | H04J 14/0223 370/400 |
| 8,396,067 | B2* | 3/2013 | Miyoshi ................. | H04L 45/00 370/389 |
| 8,483,096 | B2* | 7/2013 | Vahdat .................... | H04L 45/00 370/256 |
| 8,811,378 | B2* | 8/2014 | Benner ............... | H04L 12/4641 370/351 |
| 9,210,487 | B1* | 12/2015 | Zhao .................. | H04Q 11/0005 |
| 9,521,093 | B2* | 12/2016 | Bjornstad ............. | H04L 47/628 |
| 9,602,434 | B1* | 3/2017 | Saleh ................. | H04Q 11/0005 |
| 9,654,849 | B2* | 5/2017 | Graves ............... | H04Q 11/0005 |
| 9,819,546 | B2* | 11/2017 | Blair ...................... | H04B 10/27 |
| 10,404,586 | B2* | 9/2019 | Shiraki ............... | H04L 12/6418 |
| 2013/0287397 | A1* | 10/2013 | Frankel ................ | H04B 10/271 398/50 |
| 2015/0312659 | A1* | 10/2015 | Mehrvar ............ | H04Q 11/0066 398/45 |
| 2015/0358109 | A1* | 12/2015 | D'Errico ............ | H04Q 11/0005 398/19 |
| 2018/0070157 | A1* | 3/2018 | Menard .................. | H04Q 11/02 |
| 2018/0077064 | A1* | 3/2018 | Wang .................... | H04L 47/125 |

* cited by examiner

*Primary Examiner* — Hibret A Woldekidan

(57) ABSTRACT

An optical switch plane with one or more switch layers, each layer with multiple switches is provided. In a data center, an optical circuit switch plane is added between the device plane and packet switch plane. Direct speed of light connections may be created between devices, the data center temporally shrunk, remote devices localized, elephant flows kept out of mouse switches, mouse switch spend reduced, stranded resources recovered, layer 1 reconfigured and optimized, bare metal bent, secure tunnels created, networks physically isolated, failure resiliency increased, and packet switch congestion avoided.

20 Claims, 10 Drawing Sheets

MOUSE OVER ELEPHANT

BACKGROUND

Data centers are a collection of devices and network switches. They may also be cloud scale datacenters, hyperscale data centers or High Performance Computers (HPC).

Devices are organized into a device plane of compute related nodes made available to a composer or orchestrator, such as: a server, a multi CPU server, multiple servers clustered in a chassis, hot storage, warm storage, cold storage, CPU, memory, SSD, JBOD, GPU, FPGA, ASIC; and exclude non-compute nodes used to operate, manage, and maintain the datacenter, such as: environmental control devices, management devices, laptops.

Network switches transport data between a port on a device to a port on another device. Packet switches buffer, route, and switch data packets flowing between devices. A data plane physically transports packets between ports. A control plane routes packets based on address or other parameters, determining which switch port the packet is moved between. The packets may be OPA, PCIe, Ethernet, or other protocol packets. An Optical to Electrical to Optical (O-E-O) conversion is required. Many bit times of delay are added. OSI layers 1-3 are required. The terms packet switch and mouse switch are used interchangeably.

Packet switches are limited in the bandwidth of a single switch. A switch may contain many pieces of switch fabric within a single chassis. Multiple layers of switches are required to yield a switch plane with a sufficient number of ports. Adding one new layer adds two new hops of latency through the switch plane. A switch plane is a collection of switch layers, for instance: Top Of Rack (TOR), aggregation, leaf, and spine.

As used within this paper, east/west data flows are within a layer. One hop latency is added. For example, from one server to another or one leaf switch to another leaf switch.

North/south data flows are between layers. Data that goes north returns south again, adding 2 hops latency. For example, from a leaf layer to a spine layer back to a leaf layer.

Faster, higher bandwidth networks have historically helped the latency problem. However, this is expensive, and the approach is not extensible to ever growing device planes and the need for higher bandwidth faster networks.

Mouse flows are characterized by groups of a small number of packets to a single destination, followed by another small number of packets to a different destination. Packet switches (also called mouse switches) are particularly suited to mouse flows.

Elephant flows are characterized by groups of a large number of packets to a single destination. Circuit switches (also called elephant switches) are particularly suited to elephant flows.

Circuit switches move data from port to port, without inspecting the packet.

Transparent optical circuit switches are Optical to Optical (O-O), with no conversion to electrical. The packet cannot be read or modified by the switch. The data plane and control planes are independent. The control plane provides software definition of the switch plane. Switch plane latency is only speed of light wire propagation delay.

A bare metal cloud is an environment where selected hardware is dedicated to a customer. Layer 4-7 may be elastic within the cloud, but layer 1 is frozen.

Stranded resources are available online devices which are not used due to unacceptably high network latency to other devices they may be clustered with. Connections between different racks or different pods have increased latency as the data must be passed through more layers of packet switches to reach the intended destination.

One existing low-radix transparent optical circuit switch has 320 ports and 3.5 dB insertion loss. Another has 384 ports and 2.7 dB insertion loss. Low cost QSFP/OSFP optics modules may have a 5 dB link budget, thus only one pass through a switch is possible. Use is limited to between TOR and leaf layers, a virtual pod.

U.S. Pat. No. 9,210,487 "Implementation Of A Large-Scale Non-Blocking Optical Circuit Switch" stitches together multiple low-radix fabrics into a single box. Insertion loss is reduced by only using select lower loss ports and by using end to end power monitoring for switch alignment. This complicates switch alignment, compounding 6 orthogonal control variables into a single measurement. A 6 dB insertion loss requires expensive high power optics modules.

SUMMARY

High port-count low insertion-loss non-blocking transparent optical circuit switches enable an all optical circuit switch plane. Multiple interconnected optical circuit switches form an optical circuit switch layer. One or more switch layers form a switch plane. A low insertion loss switch is required to interconnect multiple switches. The circuit switch plane may have 100k, 1M, or more ports.

A circuit switch plane is added between the device plane and packet switch plane, adding a new dimension of flow, up/down. Up/down data flows are between circuit switch and packet switch planes. Whereas, north/south flows are between layers and east/west flows are within a layer. Circuits may be configured by the orchestrator, OS, or application. This new architecture enables previously unattainable performance.

Speed of light latency circuits may be created between any device and any other device in any rack or pod, or to any port in any packet switch layer. The data center is temporally shrunk, as devices may be accessed without encountering a packet switch. Application performance may be improved.

Elephant flows need not traverse any mouse switches. A circuit may be created for elephant flows, and destroyed when the flow is complete. Only mice need flow through mouse switches. This reduces the amount of traffic in the packet plane, allows the packet network to be oversubscribed, reduces the number of packet switch ports, and significantly reduces packet switch spend and energy consumption. Omni Path Architecture (OPA) may be a preferred protocol.

Remote devices may be direct attached, localizing devices across racks and pods. Servers may be clustered across pods. Network drives may have nearly the same performance as local drives. GPU may be clustered or attached to a server. FPGA, ASIC, or other specialized hardware can be purchased only as needed, and shared with many different customers in many different pods.

AI HPC may share neural network FPGA or ASIC resources across the datacenter. Neural network ASICs may be reconnected for wider or for deeper configurations. GPU may be connected for image processing functions. Memory may be connected as storage. Devices may be connected with non-standard protocols.

The topology of the network may conform to the data/application. Point to point, ring, mesh, tree, fat tree, star, CLOS, leaf/spine, or hybrid topologies are a matter of optimization and software definition.

HPCs may be configured for optimal network performance. Unused HPC resources may be put in a physically partitioned cloud, and time sold to merchant customers.

Bare metal may be bent to meet merchant customer requirements.

Network Function Virtualization (NFV) reduces specialized switch hardware. Ethernet may be eliminated from inside the compute plane. Ethernet may remain outside of the compute plane, as a WAN interface and to connect to operations and maintenance equipment. An Ethernet NIC may be the only hardware needed.

Hadoop requests may move the network, not the data. Storage devices may have multiple network ports and may have advanced features, such as ability to respond to Hadoop queries. A port on the storage device may be connected to each server, the storage device appears local, latencies are nearly local, and relatively little data may be actually moved. If data must actually be moved, data may be replicated from one storage device to another storage device over a dedicated circuit, without burdening the packet switches or servers. Also, terabyte scale ram memory may have Hadoop features, and data replicated from storage to memory.

Stranded resources are recovered. Orchestration may be more efficient. Clustered devices need not be located in the same physical rack or same physical pod to meet latency requirements. A Top Of Cluster (TOC) packet switch may serve the entire cluster.

Packet switch congestion may be avoided. Additional ports may be dynamically connected where they are needed.

The Top of Rack (TOR) packet switch layer may be eliminated and replaced with a Top Of Pod (TOP) switch.

Backup may not burden the packet network. Backup applications may request connections and request file transfer between intelligent devices.

Devices may be optically connected with a secure tunnel, eliminating the need for crypto. The connection may be compatible with quantum cryptography. Software may define physically isolated networks.

The circuit switch plane is transparent and agnostic. Speeds, lambdas, and protocols may be mixed anywhere within the switch, given the devices at each end of the circuit have compatible optics modules and protocols. FPGA, ASIC, and GPU need not use a standard protocol.

The network may be self-healing. Fiber and port failures may be diagnosed and traffic rerouted. Connectivity may be verified, eliminating the impact of human wiring errors.

Technology refresh may be asynchronous. The orchestrator may select the preferred resource.

Technology adoption may be sped. Limited availability, evaluation, or costly hardware may be accessed from anywhere in the datacenter.

Additional applications exist in telecommunications, test, hardware validation, and software validation. The circuit switch fabric is resilient to cosmic rays, whereas packet switch fabric may experience induced errors.

DETAILED DESCRIPTION

Figure 1:
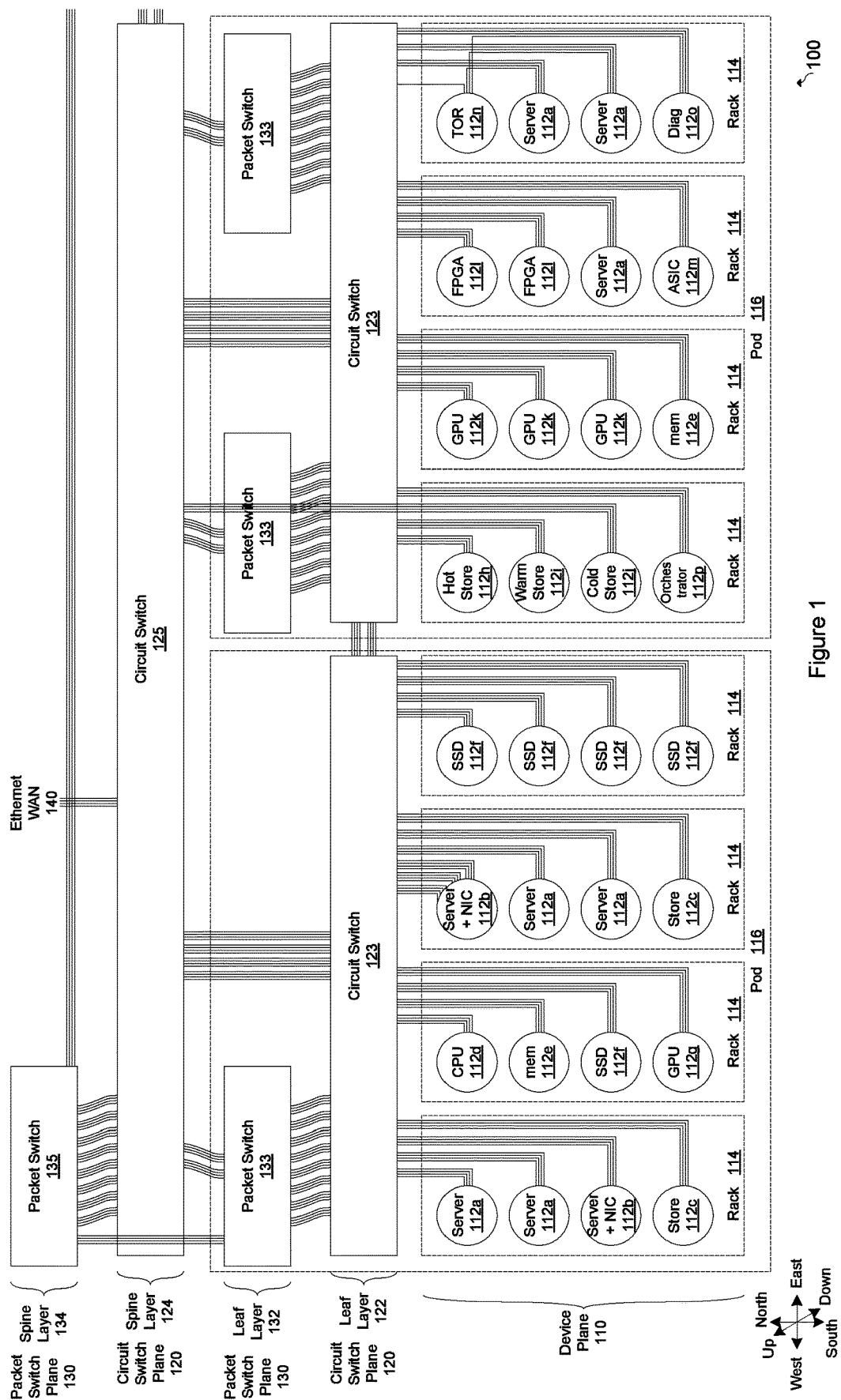
FIG. 1 is a diagram of a packet switched network over a circuit switched network.

FIG. 1 is a diagram of a packet switched fiber optic network over a circuit switched fiber optic network 100. A circuit switch plane 120 is added to the datacenter network between the device plane 110 and packet switch plane 130. Circuit switch plane 120 has a circuit leaf layer 122 with one or more leaf circuit switches 123, and packet switch plane 130 has a packet leaf layer 132 with one or more leaf packet switches 133. Circuit switch plane 120 may have a circuit spine layer 124 with one or more spine circuit switches 125, and packet switch plane 130 may have a packet spine layer 134 with one or more spine packet switches 135. A WAN 140 connection may exist.

Devices 112 may be housed in racks 114, and racks 114 organized into pods 116. Pods 116 may be containers.

Devices 112 have a network port. Ports may be Omni Path Architecture (OPA) with PSM4 optics. PSM ports may be switched independently, in 25 GBPS increments from a 100 GBPS module. Other protocols may be used, such as Ethernet, Infiniband, FibreChannel, or other protocol over fiber, or any mix of the above. Other optics may by used, such as CWDM4, coarse WDM, dense WDM, BX, LX, SX, or other optics module, or any mix of the above. Each end of a link must have compatible protocol and optics.

Switches may have a number of ports for east/west connectivity to other switches in the same layer and a number of ports for north/south connectivity to higher or lower layers. Higher layers may span multiple physical locations. In the context used within this paper, east/west does not mean within a datacenter, and north/south outside of the datacenter. A novel up/down routing dimension may be available between circuit plane 120 and packet plane 130. This is a mouse network over an elephant network. East/west is illustrated on the page as left/right, north/south as up/down, and up/down with squiggly lines. East/west and north/south flows may exist on both the circuit and packet planes. A single circuit connection may have multiple east/west and/or north/south components.

A packet layer may have the same or different topology as a circuit layer. Elephant traffic need not traverse a mouse switch, saving many mouse switch ports. The up/down direction may be oversubscribed by 7:1, 3:1, 2:1, or other circuit:packet ratio. The oversubscription ratio may have local variations. The number of packet switches over a circuit switch may vary. Some circuit switches may not have a directly corresponding packet switch. Connections to packet switches elsewhere in the network may be made.

High port-count low insertion-loss non-blocking transparent optical circuit switches are required for large switch planes. An example of such a switch is described in copending Ser. No. 16/041,815 "Optical Switch", and is incorporated by reference. 2 or 3 switch layers may have an insertion loss of <=3 dB, or <=5 dB. Switches may have 500, 1000, 2000, 4000, or more ports. Planes may have 20K, 50K, 200K, 1M, or more ports, with an insertion loss of <=3, 4, or 5 dB. Insertion losses exclude interconnect fiber. Existing low port-count switches have insufficient connectivity to form a large plane. Too many ports are used for up/down, east/west, north/south traffic compared to the number of device ports. Existing high insertion-loss switches limit hops through multiple optical switches.

Figure 2:
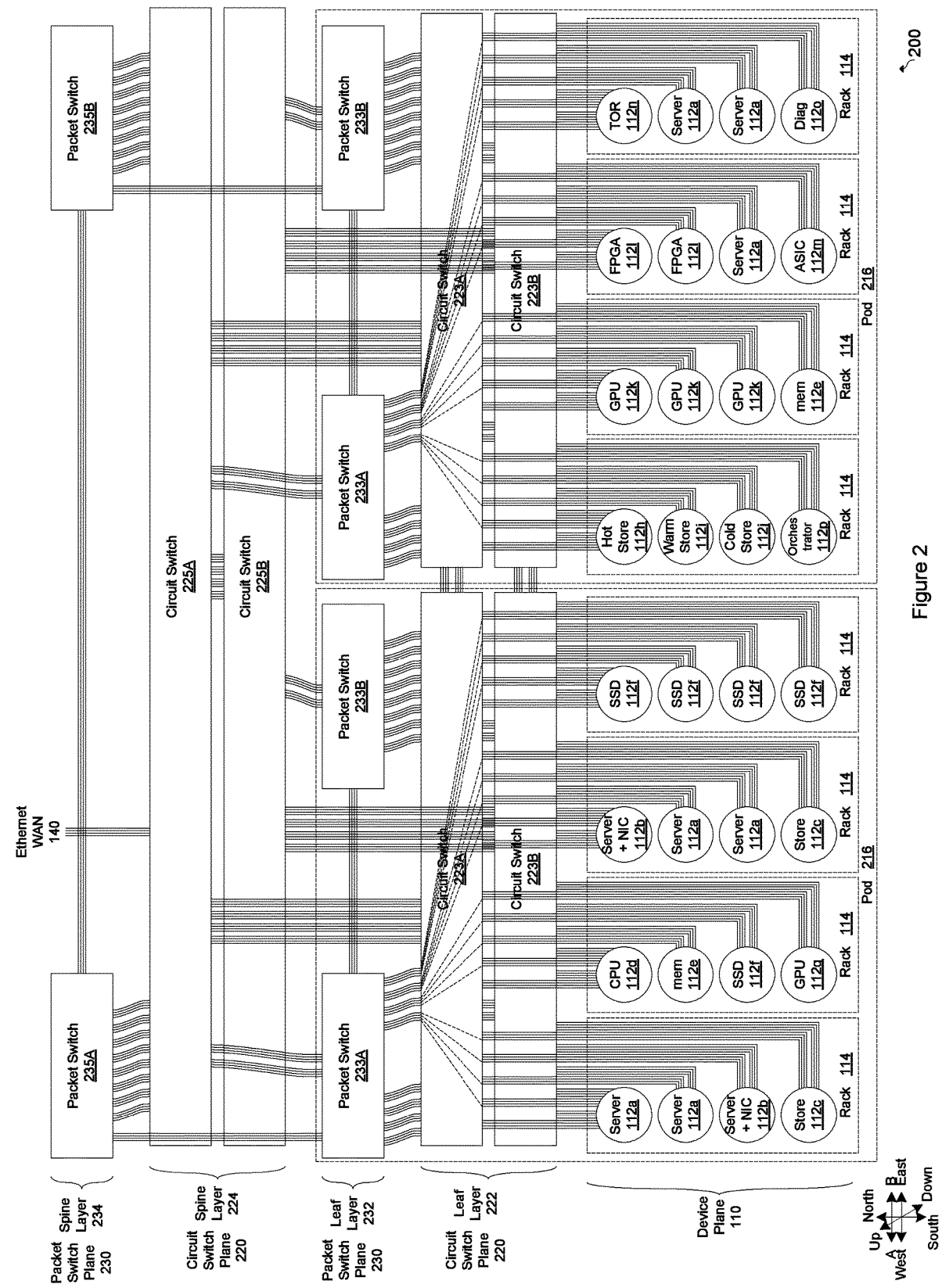
FIG. 2 is a diagram of a packet switched network over a circuit switched network with A/B redundancy and fixed packet routes.

FIG. 2 is a diagram of a packet switched network over a circuit switched network with A/B redundancy and fixed packet routes 200. A/B redundant network 200 may be similar to network 100, with the addition of one or more layers have A and B sub-layers. A/B/C or A/B/C/D sub-layers are also possible. Not all layers may require the same level of redundancy. For instance, the leaf circuit layer may only have an A sub-layer and the spine circuit layer may have A and B sub-layers. Or, a sub-layer may be present in only a portion of a layer. For devices with a single PSM port, a cable may split fibers between sub-layers.

Connections between A/B sub-layer add another routing dimension. This allows traffic to load balance between A/B sub-layers, and not be distinct redundant networks until necessary. This may be advantageous in relieving congestion. If more than one circuit switch is required in a pod, they may be partitioned horizontally as A/B layers, instead of vertically with each switch serving different racks.

Dashed lines in circuit switch 223A indicate fixed (not switched) connections between a device and a packet switch. This may be desired if all nodes have some amount of packet switched traffic. Conversely, if most nodes have point to point traffic, such as GPU clusters, HPC, direct connection, or storage replication, fixed connections to a packet switch may waste ports. Fixed connections may also be used with non-redundant network 100. This split of fixed ports from a PSM4 fiber bundle may be done inside of the switch, but without connecting to the switch fabric, to simplify datacenter cabling.

Figure 3:
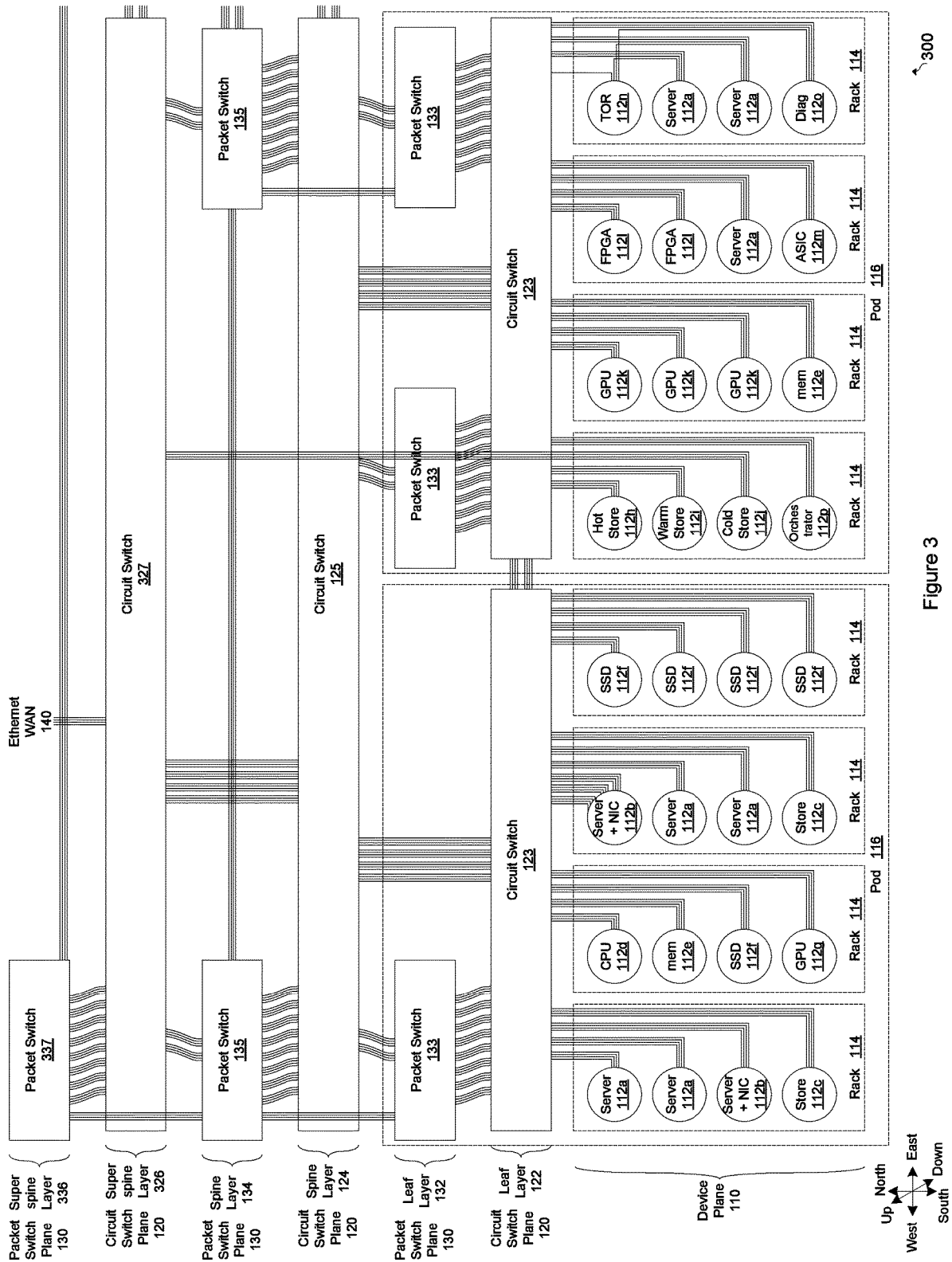
FIG. 3 is a diagram of a packet switched network over a circuit switched network with 3 layers.

FIG. 3 is a diagram of a packet switched network over a circuit switched network with 3 layers 300. Three layer network 300 may be similar to network 100, but with an additional super spine layer 326 and 336. This allows a high port-count low insertion-loss switch of 1024 ports and 0.4 dB insertion loss, with 5 dB link budget optics, to realize a 268M port network. Or, a 512 port 0.4 db insertion loss switch to form a 33M port network. Compared to the 2 layer network 100, a 524K port and 131K port network may be realized, respectively. Preferably, the insertion loss of the circuit plane is <=3 dB, but may be <=3.5, 4, or 5 dB.

FIG. 4a-e illustrates some possible configurations of network 100. Highlighted routes illustrate connections used in the example application. Preferably devices 112 may forward packets, for low bandwidth requirements this eliminates the need for a connection to a packet switch.

Figure 4A:
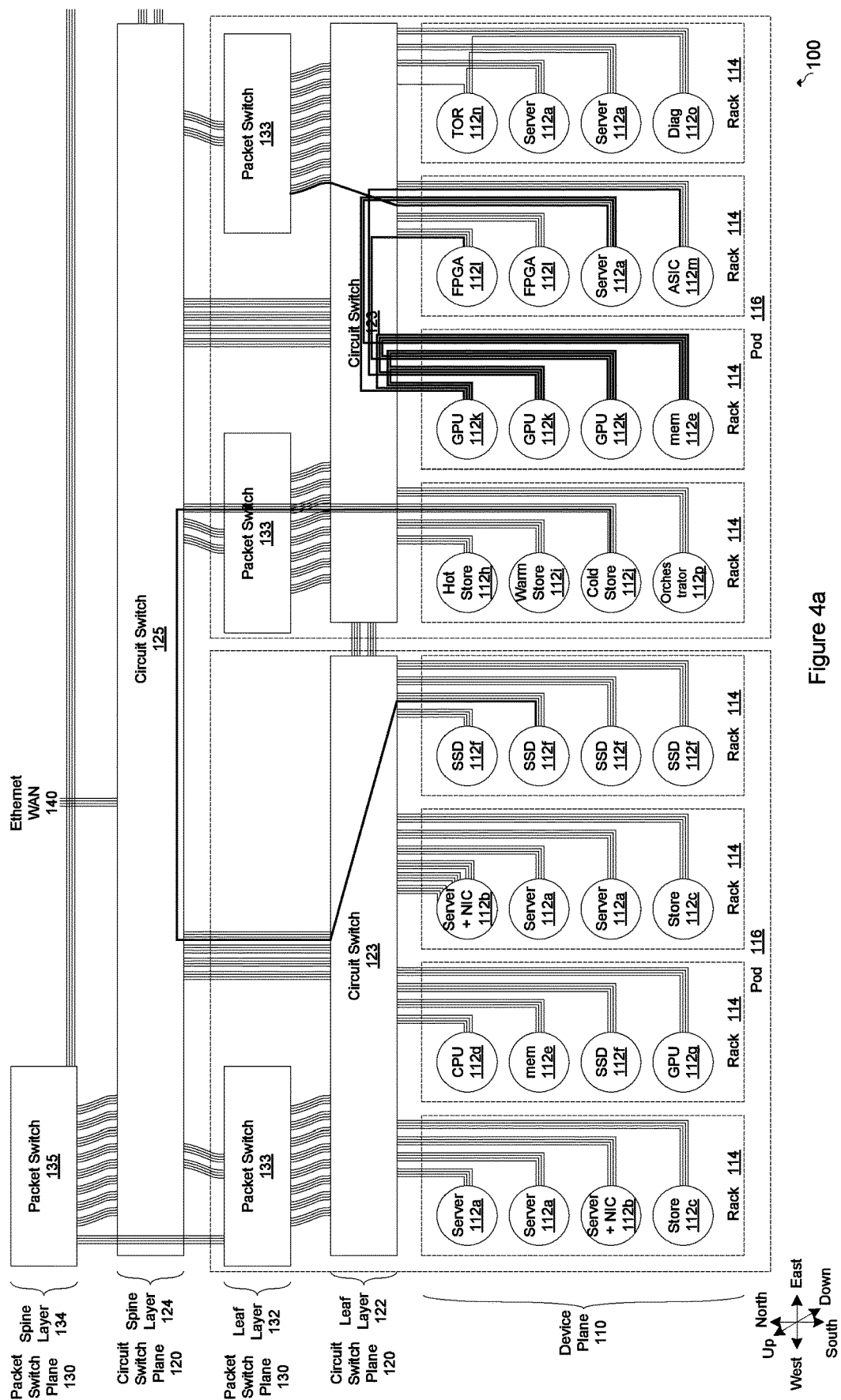
FIG. 4a illustrates a GPU cluster with FPGA and ASIC assist and backup.

FIG. 4a illustrates a GPU cluster with FPGA and ASIC assist. Also, backup is illustrated. As an example, GPU 112k may be fully meshed, memory 112e may be in a star topology with GPU 112k and server 112a, FPGA 112l may assist GPU 112k. GPU 112k and FPGA 112l need not use a standard packet format. GPU 112k may be added in rack scale increments. Specially configured racks with a mix of GPU 112k and server 112a are no longer necessary. This configuration may be useful for rendering and compressing video and allowing asymmetric hardware refresh.

Backup network load need not burden a packet switch, or other network traffic. Circuit switched plane 120 may connect SSD 112f and cold store 112j. SSD 112f and cold store 112j are preferably able to stream files, with server 112a (not shown) running the backup application only needing to generate transfer requests and confirm completion. Optionally, some devices, such as cold store 112j, may have a low percentage of use within its pod and may be hard connected directly to the spine layer. Files may also be moved between store 112c, SSD 112f, JBOD, NVM, hard disk, hot storage 112h, warm storage 112i, cold storage 112j, backup, or other device.

Figure 4B:
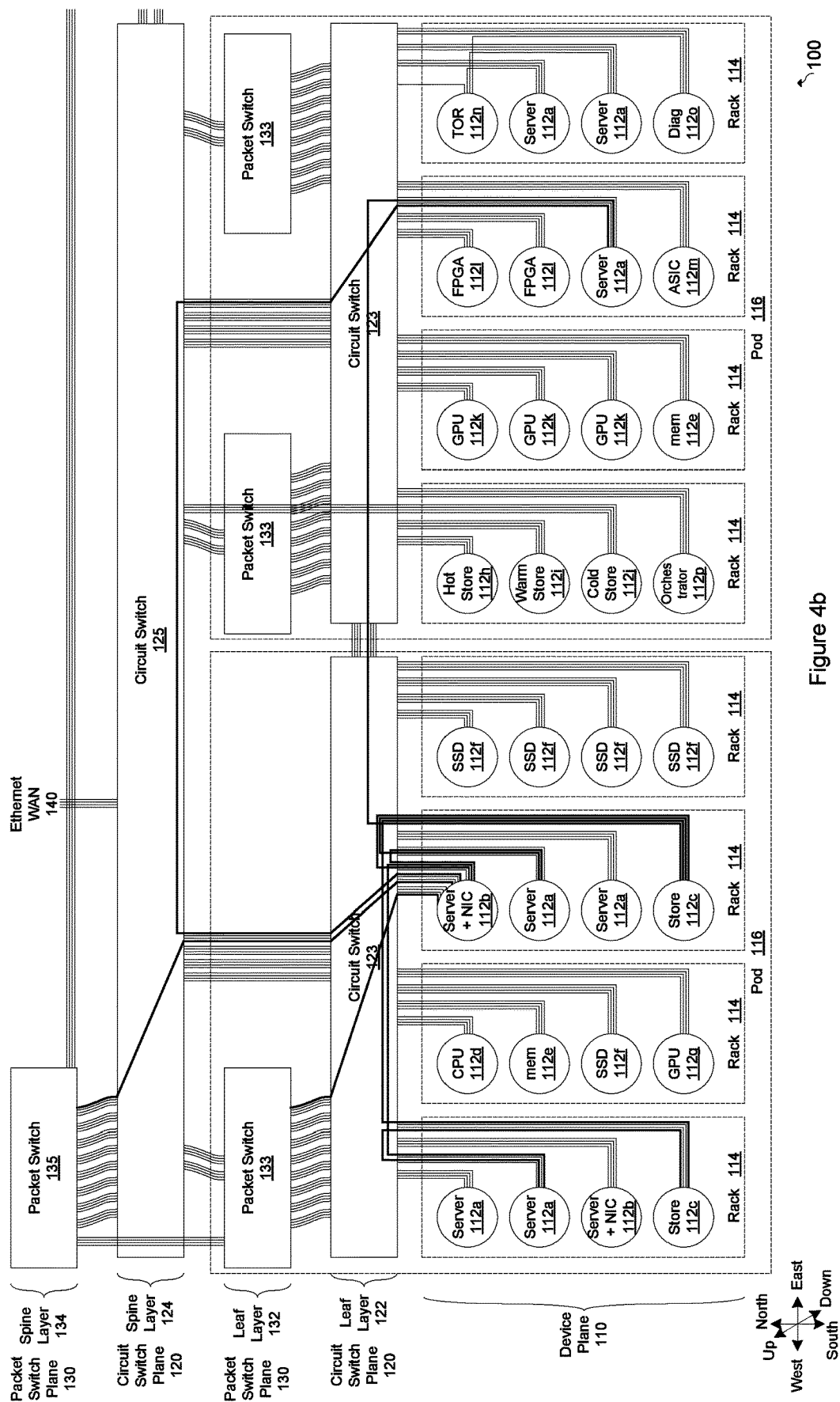
FIG. 4b illustrates a server cluster and Hadoop replication.

FIG. 4b illustrates a server cluster and Hadoop replication. Servers 112a may be clustered in a topology selected to best meet data or process load. Servers 112a may be located in different pods. The route cost of the north/south and east/west connections to the server in the remote pod are nearly identical. Server 112a may connect directly to a spine packet switch 135, avoiding the latency of leaf packet switch 133. Server 112b may be used interchangeably with server 112a when not used as a WAN interface.

Storage 112c may connect to multiple servers 112a in various pods 116. Storage 112c may be intelligent storage, capable of processing Hadoop requests. Hadoop replication may be a logical function, moving the network and not moving the data. Additionally, storage 112c may connect to other storage 112c, allowing replication between devices without burdening servers 112a or the packet network 130. This may be necessary due to limited ports on storage 112c. Alternatively, a packet switch 133 may be used for aggregation.

Figure 4C:
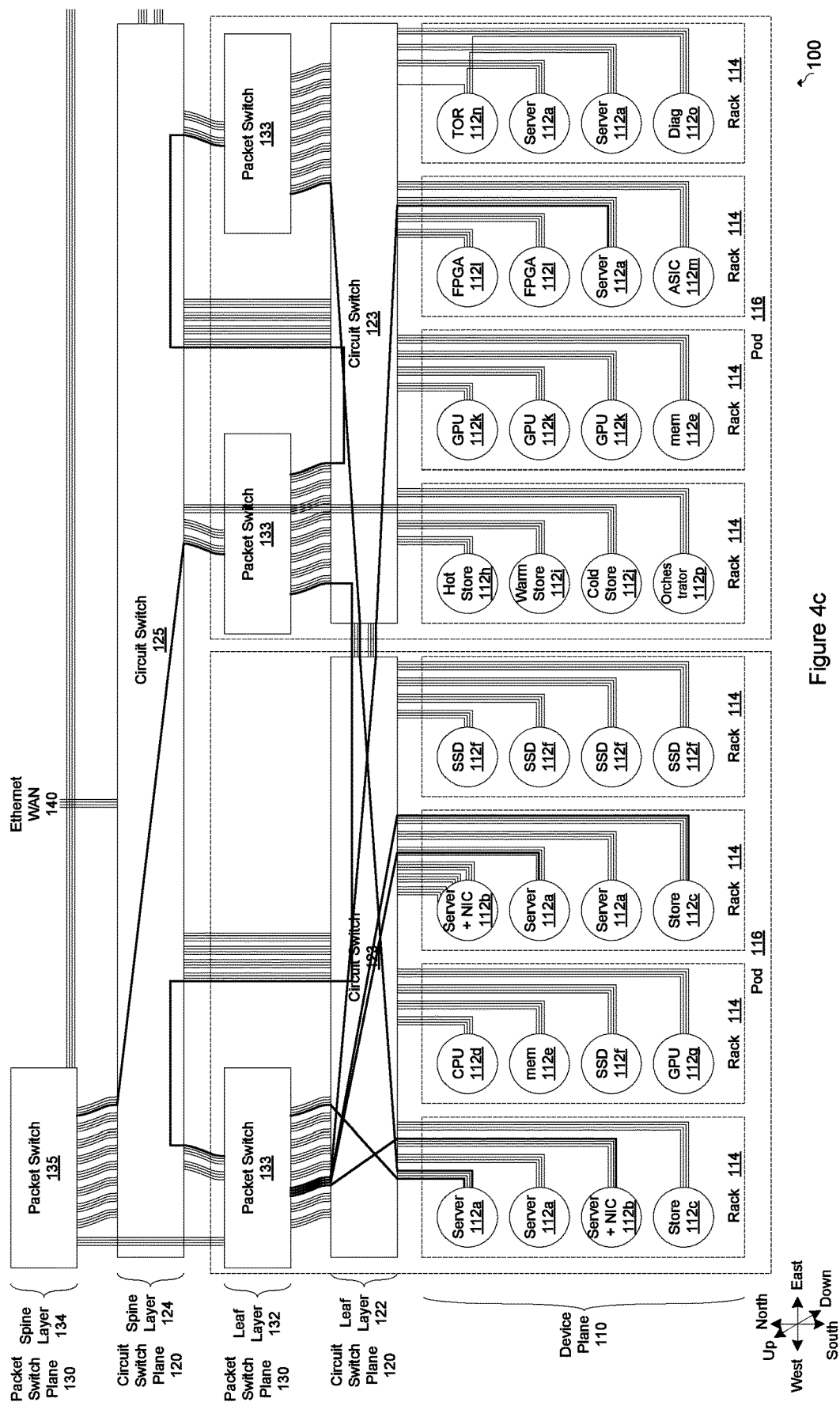
FIG. 4c illustrates packet congestion and latency reduction.

FIG. 4c illustrates packet congestion and latency reduction. Multiple ports of server 112a may connect to one or more switches 133 for added bandwidth. Leaf switches 132 may connect to other leaf switches 132, instead of a spine switch 134, adding additional hybridized layers of switching. Or, additional switch ports may be connected for added bandwidth.

Packet switch 133 may be a Top Of Cluster (TOC) switch. All nodes of the cluster connect to the same switch, regardless of which rack of pod they may be in. Any node within the cluster may reach any other node within the cluster with a one hop latency.

Figure 4D:
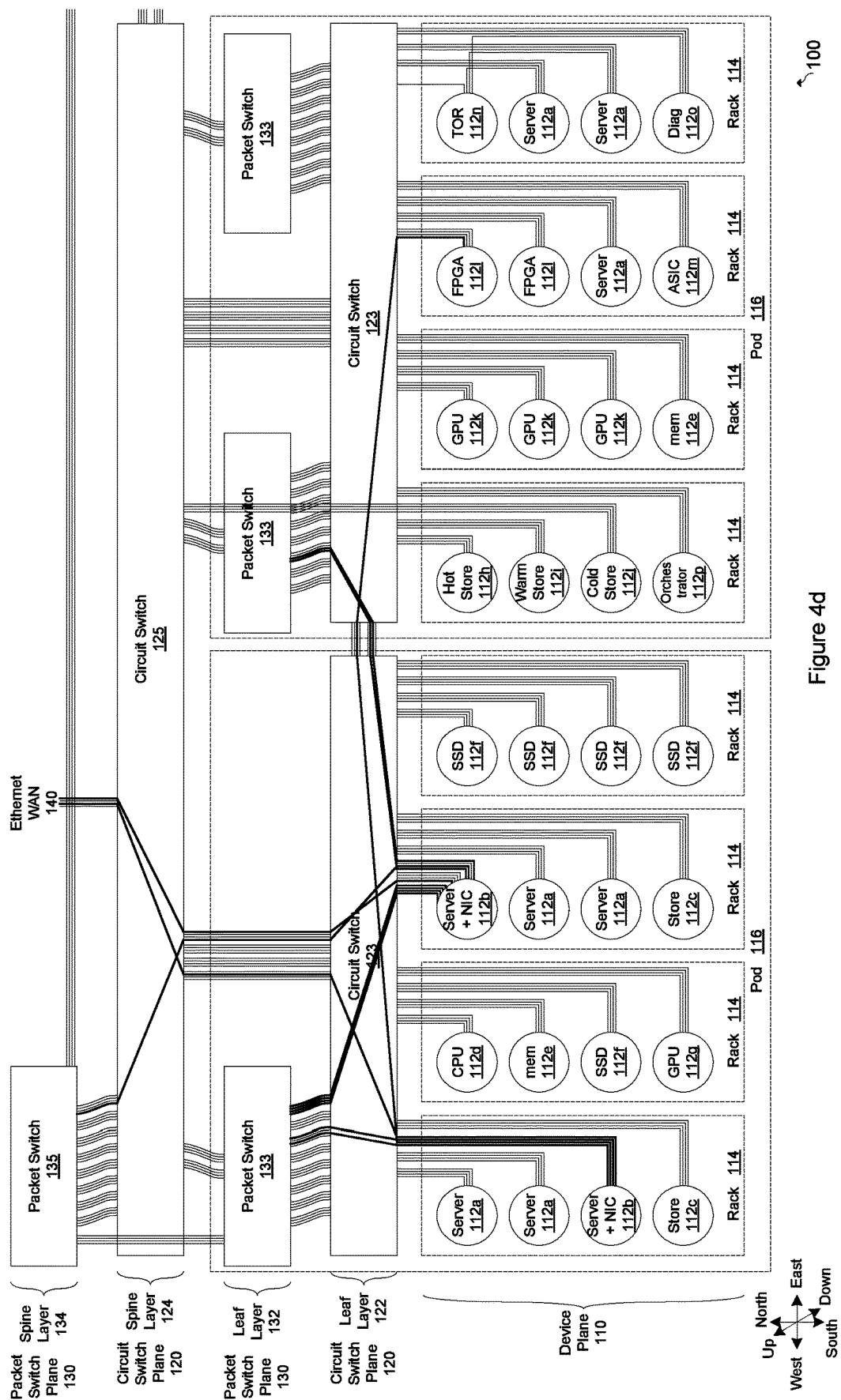
FIG. 4d illustrates NFV.

FIG. 4d illustrates Network Function Virtualization (NFV). Ethernet may be nearly eliminated from the network. An ethernet NIC and appropriate WAN optics may be added to server 112b. No other modifications are required, as the circuit switch plane 120 is wavelength and protocol agnostic. Ethernet WAN 140 may connect to the circuit switch plane 120 for server redundancy. Server 112b may take on routing functions and connect to spine switch 136 or leaf switch 133. Additional packet ports may be used as necessary from switches in other pods. Some network functions are more efficiently implemented in FPGA 112l or ASIC 112m than in server 112b software. FPGA and servers may be used for switching functions during peak hours, and released to other customers off peak.

Figure 4E:
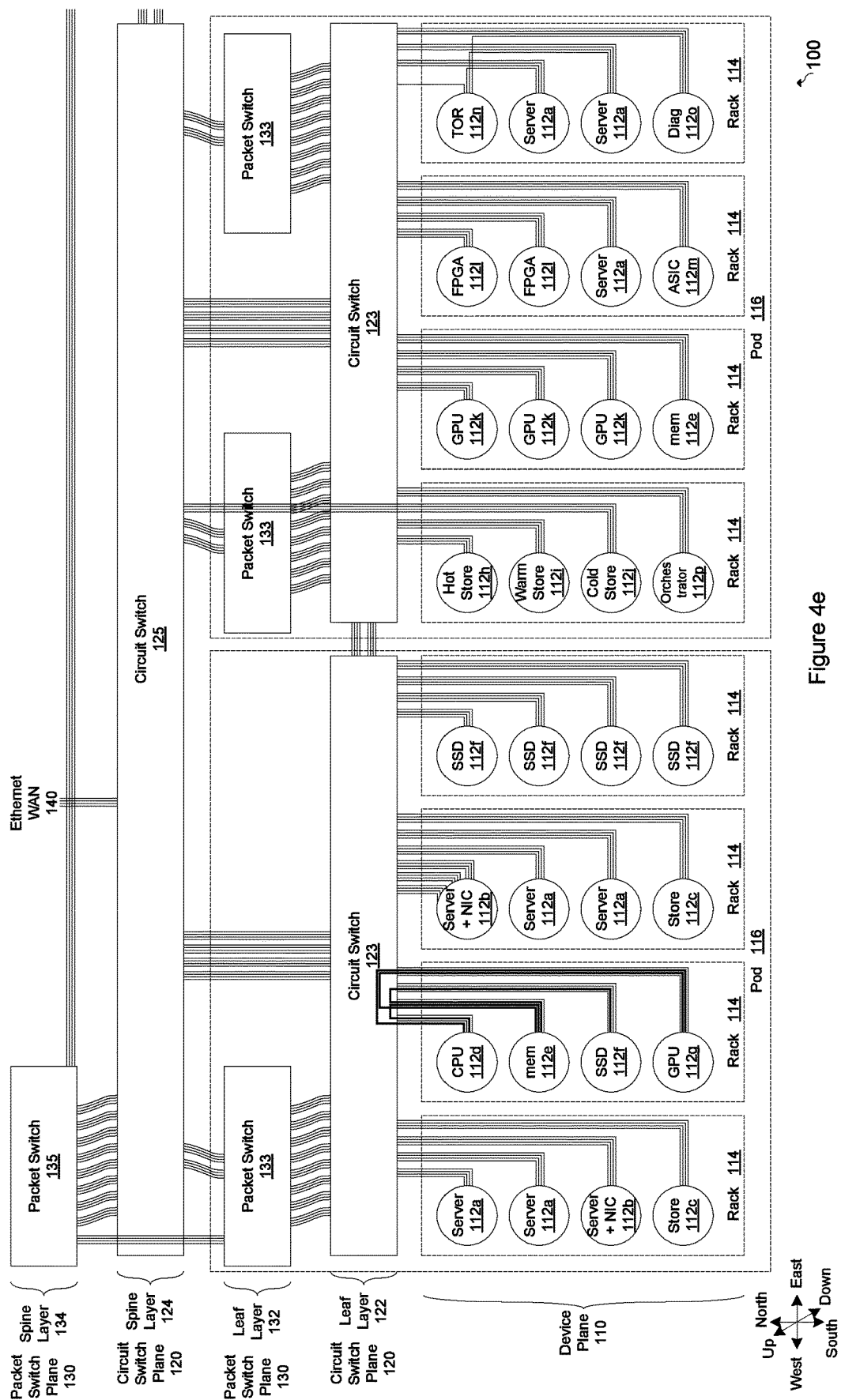
FIG. 4e illustrates a composable server.

FIG. 4e illustrates a composable server. A server may be disaggregated into building blocks, CPU 112d, memory 112e, storage 112f, and GPU 112g. Memory 112e may have a mix of SRAM, DDR, flash, or other memory types and a memory manager with a network port. These components may be composed to create servers better sized for a particular task.

Figure 4F:
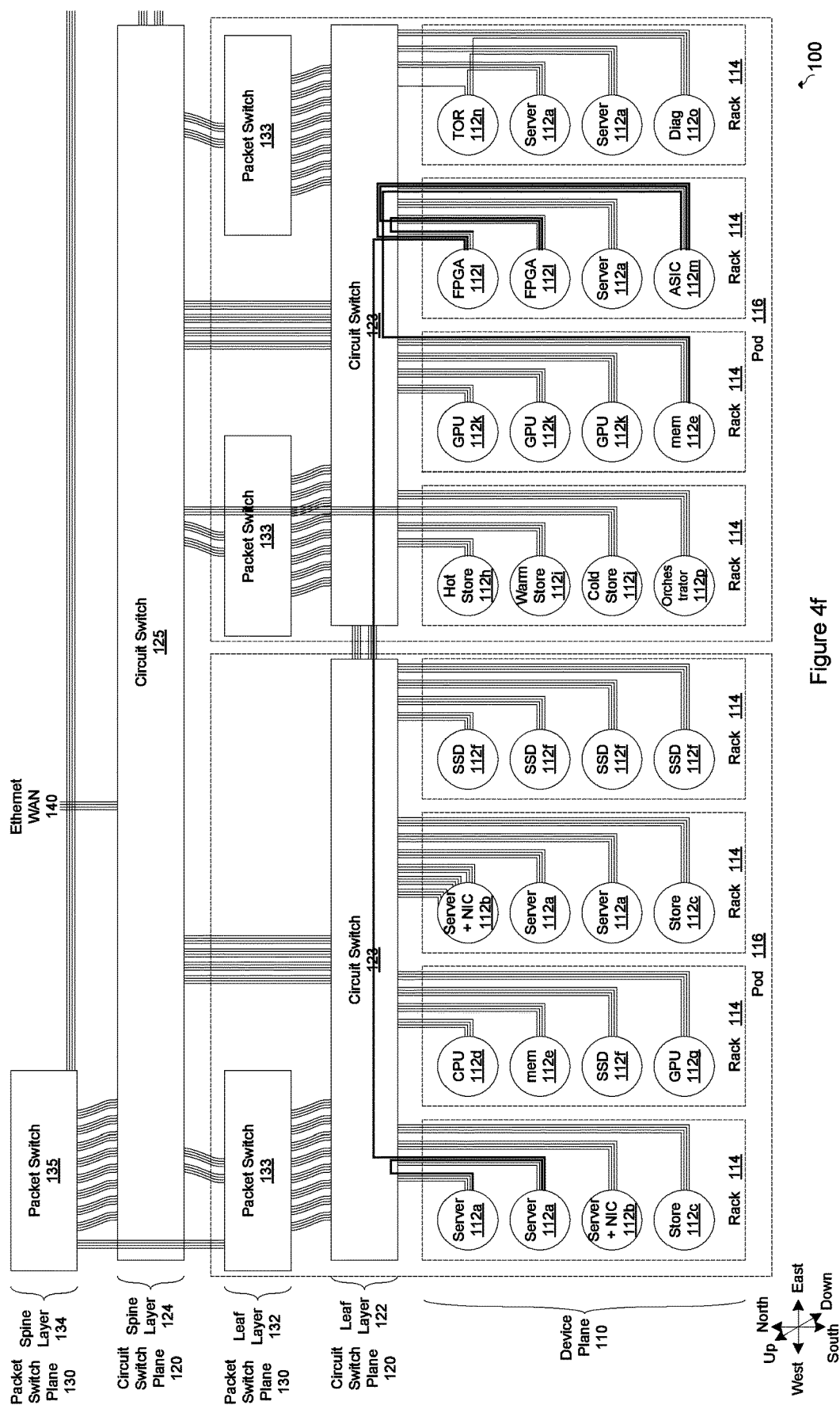
FIG. 4f illustrates an AI HPC cloud.

FIG. 4f illustrates an AI HPC cloud. An AI application may require a neural network ASIC 112m. ASIC 112m may be connected to memory 112e to record neural evolution. FPGA 112l may assist ASIC 112m. Server cluster 112a may reside in a different pod. Given network latency constraints and using only an existing packet network, ASIC 112m may be too costly to deploy throughout the datacenter and reserving server 112a time within a pod may also be too costly.

Other functionality (not illustrated) may include diagnostic 112o with TDR, power meter, or other diagnostic hardware which may be scripted to validate switch ports, fiber, and fiber connectivity. Human errors in fiber connectivity might be corrected by updating port mapping, instead of moving fiber to correct the wiring error.

Figure 5:
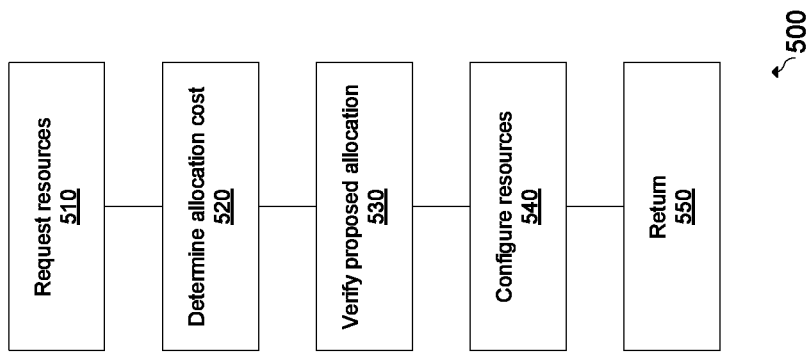
FIG. 5 is a method to orchestrate a circuit switched network.

FIG. 5 is a method to compose and orchestrate a circuit switched network 500.

Resource requests may be accepted in step 510. The request may contain: customer contract requirements; direct connect requests; hardware allocation request; drive mount/unmount requests; open/close stream request; Hadoop requests; packet switch traffic statistics; packet switch latency; composition script request; application request; and/or other sources. Certain OS functions may be modified to simplify request generation.

Direct connect, drive mount/unmount, and open/close stream requests may configure a circuit switched route between source and destination devices.

Hadoop replication requests may configure circuit switched routes between multiple servers and a single storage device, moving the network instead of moving the data.

Latency within a packet switch is dependent on source and destination ports. Use of QOS or packet traffic statistics may be used to configure the circuit switched network to reorder packet switch ports.

Backup applications may configure various routes between source and destination.

FEA, HPC, or AI HPC applications may cluster servers into a network topology that best matches the data topology.

Clustered devices may have a packet switch port. All packet switch ports for the cluster may connect to a single TOC packet switch.

A composer may provide a requested resources and connection topology.

Lowest cost of available resource allocations may be determined in step 520. Cost of resources required to meet the resource request may be calculated using: number and type of ports and devices consumed; packet switch port to port latency; wire latency; minimum quantity of unallocated resources; billable cost; and/or other factors. If a sufficiently low cost route is not available, existing routes may be moved to a higher cost route that still within acceptable cost.

Verify proposed resource allocation in step 530. If the allocation fails to meet: latency requirements; physical isolation requirements; and/or other factors, the request may be rejected.

Network and devices are configured in step 540.

The orchestration request returns in step 550.

The previous examples are intended to be illustrative. Countless additional variations and applications are readily envisioned. Planes and layers may be partially implemented. Resource orchestration will vary.

The invention claimed is:

1. An optical data network with up/down connectivity, including:
    an optical circuit switch plane, between an end device plane, and an optical packet switch plane;
    said end device plane includes a multitude of end devices;
    said end devices include: servers, GPUs, FPGAs, ASICs, neural networks, memory, or storage;
    said circuit switch plane includes two or more circuit switch layers with north/south connectivity;
    said packet switch plane includes two or more packet switch layers with north/south connectivity; and
    said two or more layers of said circuit plane are interconnected with up/down connectivity to respective layers of said two or more layers of said packet plane.

2. The network of claim 1, where said circuit switch plane includes multiple hierarchical optical switch layers; and
    each layer including at least two optical circuit switches.

3. The network of claim 2, where said circuit switch plane includes two or more switch layers;
    200K or more ports; and
    The maximum insertion loss of said plane is <=3 dB.

4. The network of claim 2, where said circuit switch plane includes three or more switch layers;
    1M or more ports; and
    the maximum insertion loss of said plane is <=5 dB.

5. The network of claim 2, where said plane includes 20K or more optical ports; and
    the maximum insertion loss of said plane is <=3 dB.

6. The network of claim 1, where a majority of ports from said device plane couple to said circuit switch plane.

7. The network of claim 1, where a majority of ports from a said packet switch plane couple to said circuit switch plane.

8. The network of claim 1, where a majority of said devices include one or more PSM optics modules.

9. The network of claim 1, where a majority of said devices include multiple optical network ports; and
    a said circuit switch couples some said ports from said devices to a said packet switch, without circuit switching said connections.

10. The network of claim 1, where two said devices, each located in a different rack, are optically connected via a circuit that does not traverse said packet plane.

11. The network of claim 1, where two said devices, each located in a different pod, are optically connected via a circuit that does not traverse said packet plane.

12. The network of claim 1, where southbound ports of a single said packet switch are optically coupled via said circuit switch plane to said devices located in different racks.

13. The network of claim 1, where one or more WAN ports are coupled to a said device plane via said circuit switch plane, without coupling to said packet switch plane.

14. The network of claim 1, where said packet switch ports are oversubscribed; and
    the oversubscription ratio of device ports to packet switch ports is 2:1 or greater.

15. A method to configure the network of claim 1, including:
    accepting a request for resources,
    determining a low-cost route,
    verifying the route meets requirements, and
    configuring said circuit network and said devices.

16. The method of claim 15, further including:
    configuring said circuit switched plane to order connections to said packet switch ports, as to produce a more desired packet switch latency.

17. The method of claim 15, further including:
    dynamically clustering a multitude of said devices by reconfiguring said circuit switched plane.

18. The method of claim 15, further including:
    direct connecting GPU, FPGA, or ASIC devices to a server or another GPU, FPGA, or ASIC.

19. The network of claim 1, where 33% or more of ports from said device plane couple to said circuit switch plane; where 33% or more of ports from said packet switch plane couple to said circuit switch plane; and where the sum of the number of ports of all said circuit switches is greater than 20,000, with a circuit switch plane insertion loss of <=5 dB.

20. The network of claim 1, where said up/down connectivity between said circuit/packet planes also has a north/south connectivity between different said layers of said planes.

* * * * *